(12) United States Patent
Xu

(10) Patent No.: US 8,803,849 B2
(45) Date of Patent: Aug. 12, 2014

(54) ELECTRONIC PENCIL AND METHOD FOR INDICATING COLOR OF ELECTRONIC PENCIL

(75) Inventor: Xin Xu, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 168 days.

(21) Appl. No.: 13/477,069

(22) Filed: May 22, 2012

(65) Prior Publication Data

US 2013/0033462 A1 Feb. 7, 2013

(30) Foreign Application Priority Data

Aug. 1, 2011 (CN) .......................... 2011 1 0218008

(51) Int. Cl.
*G06F 3/033* (2013.01)
(52) U.S. Cl.
USPC .......................................... 345/179; 345/173

(58) Field of Classification Search
USPC ................................................. 345/173, 179
See application file for complete search history.

(56) References Cited

U.S. PATENT DOCUMENTS

| | | | | |
|---|---|---|---|---|
| 5,959,616 A | * | 9/1999 | Challener | 345/179 |
| 6,064,374 A | * | 5/2000 | Fukuzaki | 345/179 |
| 2002/0080125 A1 | * | 6/2002 | Ikeda et al. | 345/173 |
| 2005/0116940 A1 | * | 6/2005 | Dawson | 345/179 |

* cited by examiner

*Primary Examiner* — Premal Patel
(74) *Attorney, Agent, or Firm* — Novak Druce Connolly Bove + Quigg LLP

(57) ABSTRACT

An electronic pencil reads color information from a first color signal wirelessly sent from a drawing board, controls a color unit in the electronic pencil to indicate a corresponding color according to the read color information, and transmits a second color signal as a reply to the first color signal to the drawing board. The drawing board displays track having the corresponding color when a user draws on the drawing board using the electronic pencil.

17 Claims, 8 Drawing Sheets

| 1st bit | 2nd bit | Explication |
|---|---|---|
| 0 | 1 | Request for changing color |
| 1 | 0 | Feedback of the request |
| 0 | 0 | Remain |
| 1 | 1 | Remain |

FIG. 6B

| 3rd bit | 4th bit | 5th bit | 6th bit | 7th bit | 8th bit | Corresponding color |
|---|---|---|---|---|---|---|
| 0 | 0 | 0 | 0 | 0 | 0 | Remain |
| 0 | 0 | 0 | 0 | 0 | 1 | Red |
| 0 | 0 | 0 | 0 | 1 | 0 | Yellow |
| 0 | 0 | 0 | 1 | 0 | 0 | Green |
| 0 | 0 | 1 | 0 | 0 | 0 | Blue |
| 0 | 0 | 0 | 0 | 1 | 1 | Pink |
| ... | ... | ... | ... | ... | ... | ... |

FIG. 6C

ELECTRONIC PENCIL AND METHOD FOR INDICATING COLOR OF ELECTRONIC PENCIL

BACKGROUND

1. Technical Field

Embodiments of the present disclosure generally relate to electronic devices, and more particularly to an electronic pencil and a method for indicating a color of the electronic pencil.

2. Description of Related Art

People are using touch panel computers as drawing boards, to draw or design or teach drawing. In such a manner, users may use a electronic pencil as a drawing pencil, and use the electrical pencil to click on a color in a color palette of the drawing board to change the color of the electronic pencil. However, the color is not indicated on the electronic pencil, so many users cannot directly know the color of the electronic pencil without first drawing on the drawing boards.

BRIEF DESCRIPTION OF THE DRAWINGS

FIG. 6A-FIG. 6C are schematic diagrams of color signals.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in hardware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
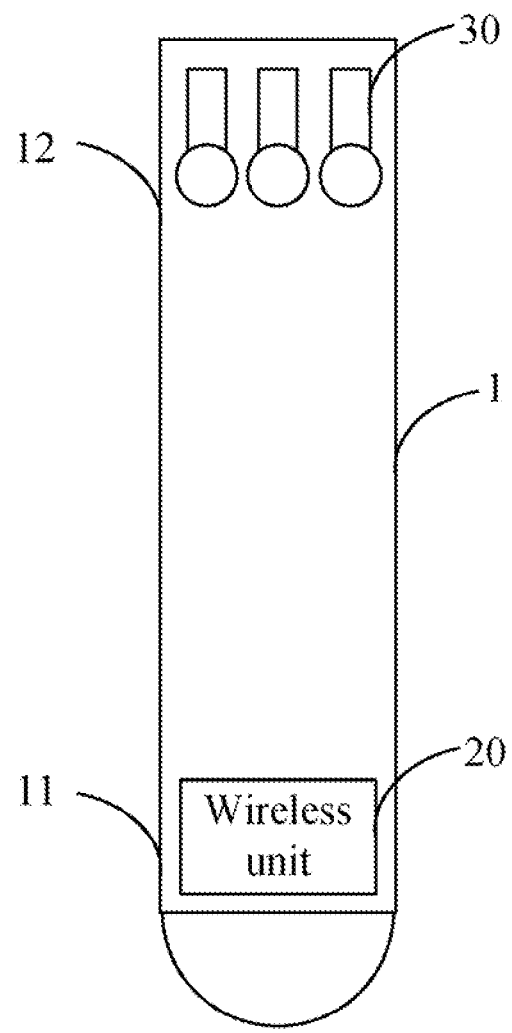
FIG. 1 is a schematic diagram of one embodiment of an electronic pencil.

FIG. 1 is a schematic diagram of one embodiment of an electronic pencil 1. In the embodiment, a wireless unit 20 is embedded in a head part 2 of the electronic pencil 1, and a color unit 30 is embedded in a body part 3 of the electronic pencil 1. The wireless unit 20 may be a near field communication (NFC) device, a WIFI device, or a wireless infrared communication device. The color unit 30 include a group of color light emitting diode (LED) lights and control circuits to control the LED lights, to indicate colors on the body part 3 of the electronic pencil 1.

Figure 2:
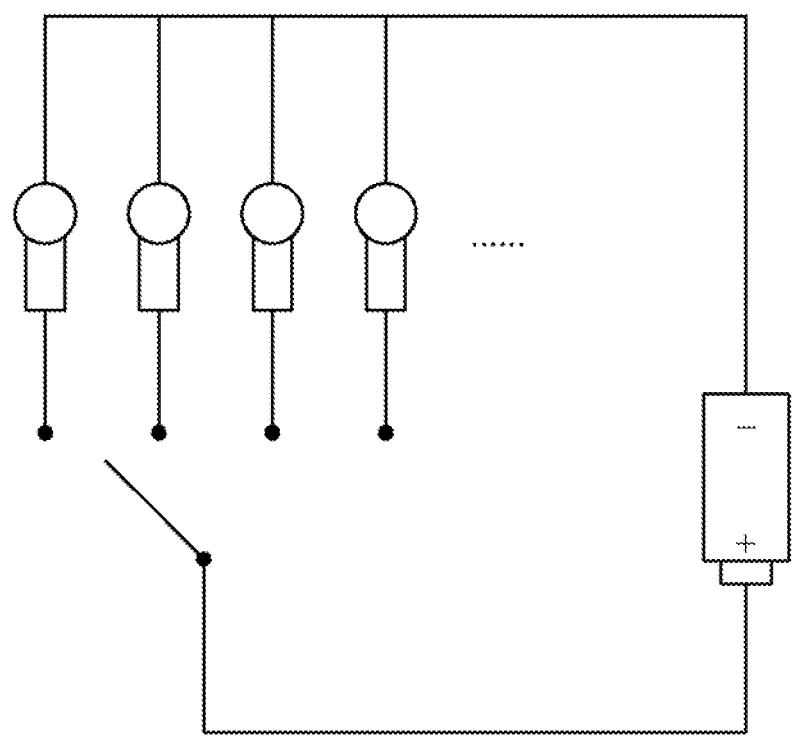
FIG. 2 is a schematic diagram of one embodiment of a control circuit of a color unit in FIG. 1.

FIG. 2 is a schematic diagram of one embodiment of a control circuit of the color unit 30. In the embodiment, the LED lights are arranged in parallel. A control switch can connect to one of the LED lights in the control circuit, to switch on the LED light and indicate the color of the LED light on the body part 3 of the electronic pencil 1.

Figure 3:
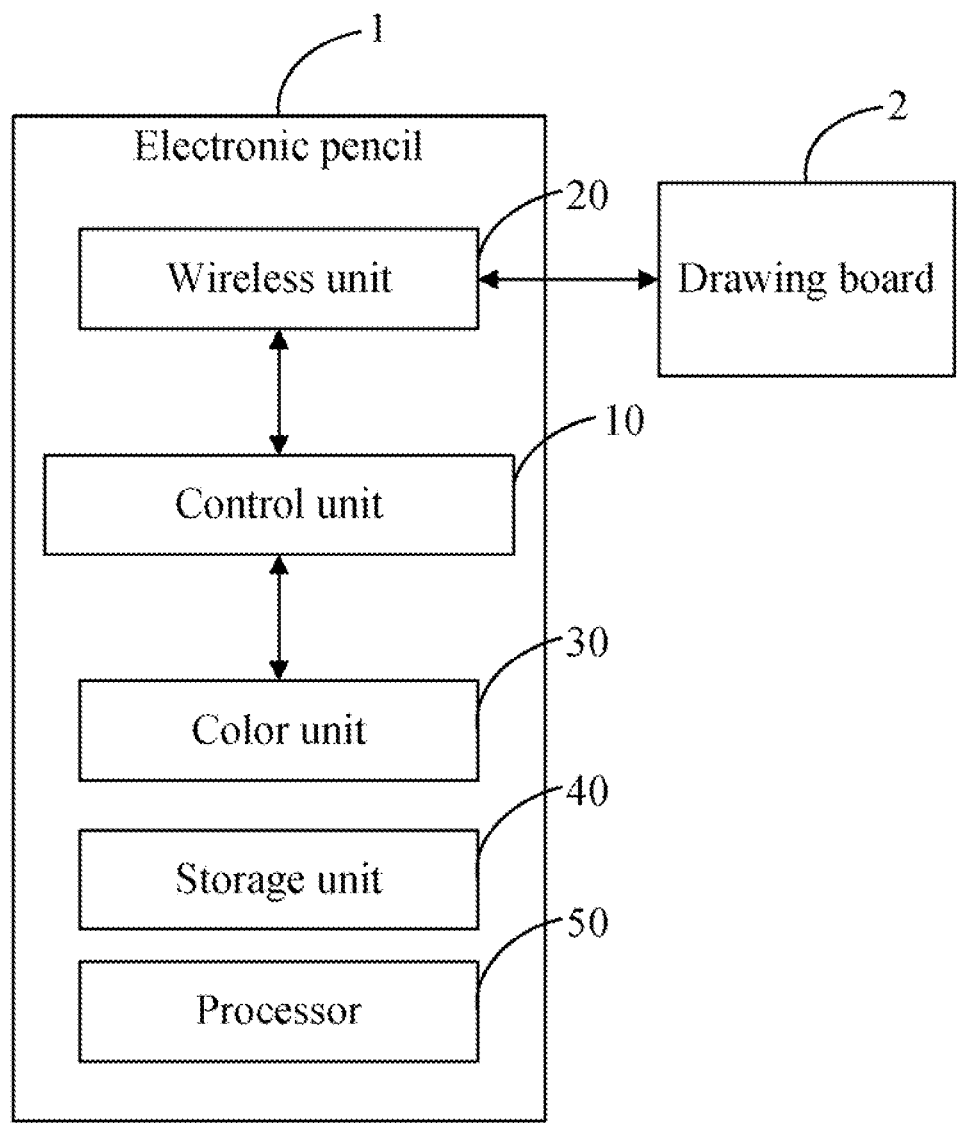
FIG. 3 is a block diagram of one embodiment of function modules of the electronic pencil in FIG. 1.

FIG. 3 is a block diagram of one embodiment of function modules of the electronic pencil 1. The electronic pencil further includes a control unit 10, a storage unit 40, and a processor 50. The control unit 10 controls the control switch in the control circuit. The electronic pencil 1 communicates with a drawing board 2 through the wireless unit 20. The drawing board 2 may be a touch panel computer, for example.

Figure 4:
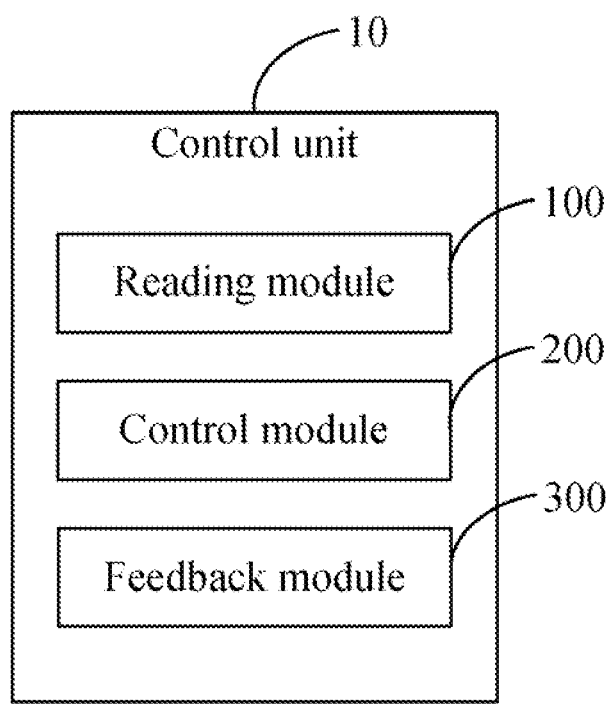
FIG. 4 is a block diagram of one embodiment of function modules of the control unit in FIG. 2.

In one embodiment, the control unit 10 may include one or more function modules (a description is given in FIG. 4). The one or more function modules may comprise computerized code in the form of one or more programs that are stored in the storage unit 40, and executed by the processor 50 to provide the functions of the control unit 10. The storage unit 40 may be a cache or a dedicated memory, such as an EPROM or a flash memory.

FIG. 4 is a block diagram of one embodiment of the function modules of the control unit 10. In one embodiment, the control unit 10 includes a reading module 100, a control module 200, and a feedback module 300. A detailed description of the functions of the modules 100-300 is given in FIG. 5.

Figure 5:
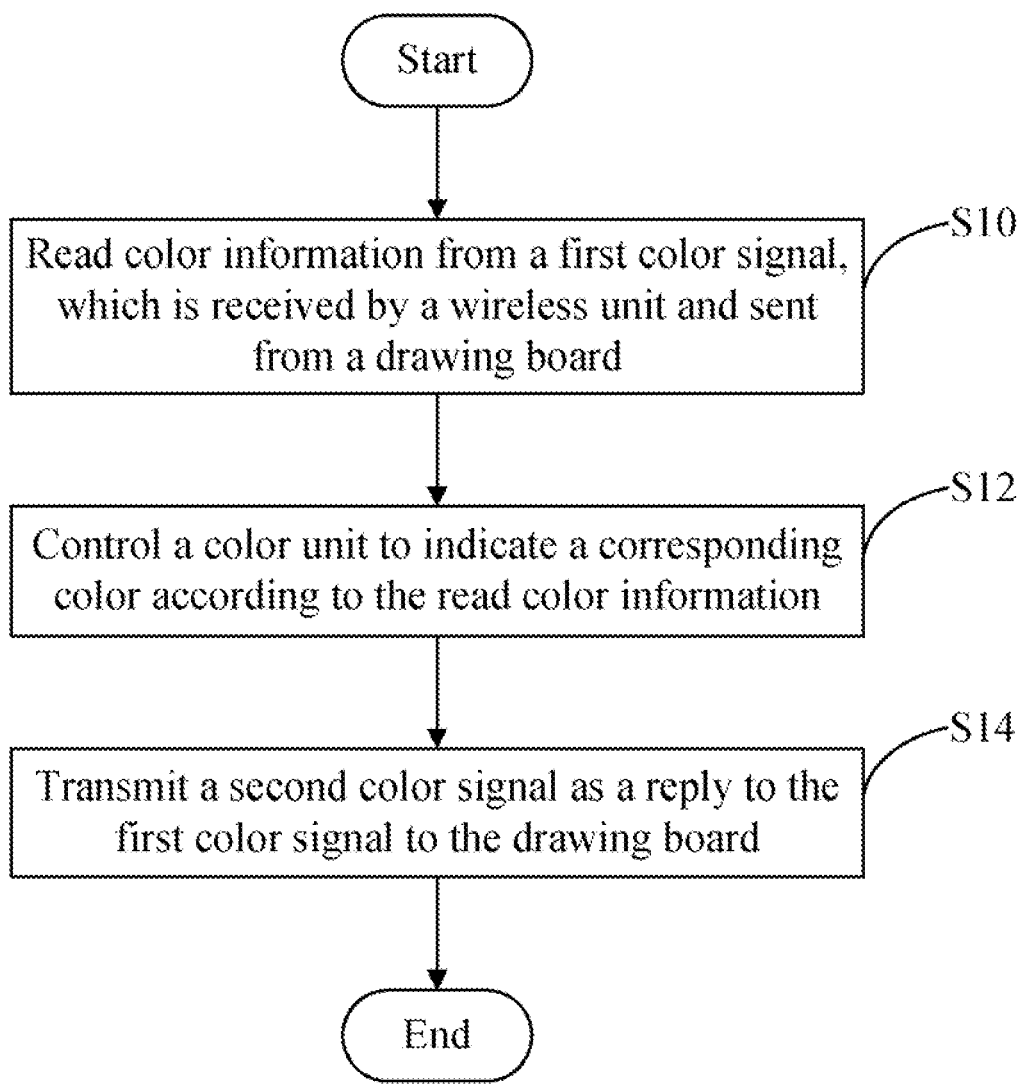
FIG. 5 is a flowchart of one embodiment of a method for indicating a color of the electronic pencil.

FIG. 5 is a flowchart of one embodiment of a method for indicating a color of the electronic pencil 1. Depending on the embodiment, additional steps may be added, others removed, and the ordering of the steps may be changed.

In step S10, the reading module 100 reads color information from a first color signal, which is received by the wireless unit 20 and sent from the drawing board 2.

Figure 6A:
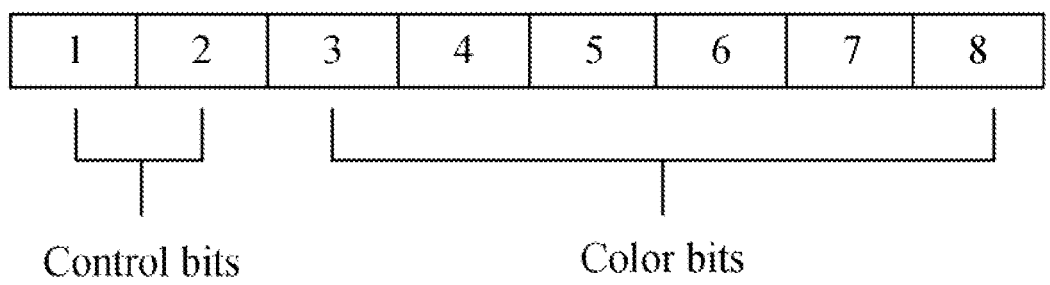

In the embodiment, when a user selects a color in a color palette of the drawing board 2, the drawing board 2 transmits the first color signal to the wireless unit 20 using the NFC, WIFI, or wireless infrared communication technology. FIG. 6A is a schematic diagram of a format of the first color signal. In FIG. 6A, the first color signal is 8-bit data, and each bit data has a value 0 or 1. The first bit and the second bit of the first color signal are control bits, which represent a type of the first color signal. For example, 01 represents a request for changing the color of the electronic pencil 1, 10 represents a feedback of the request for changing the color of the electronic pencil 1, 00 or 11 represents remaining the color of the electronic pencil 1 (as shown in FIG. 6B). The third bit to the eighth bit of the first color signal are color bits, which represent a desired color of the electronic pencil 1. For example, 000001 represents the user desires the electronic pencil 1 to output a color red (as shown in FIG. 6C).

When the drawing board 2 transmits the first color signal to the wireless unit 20, the first bit and the second bit of the first color signal are 01. For example, if the first color signal is 01000001, which represents the request for requiring the electronic pencil 1 to output the color red, then the reading module 100 reads the color information 000001 (i.e., red) from the first color signal.

In step S12, the control module 200 controls the color unit 30 to indicate a corresponding color according to the read color information. For example, if the read color information is 000001, the control module 200 controls the control switch in the control circuit (as shown in FIG. 2) to switch on a red LED light, to indicate the color red on the body part 3 of the electronic pencil 1.

In step S14, the feedback module 300 transmits a second color signal as a reply to the first color signal to the drawing board 2. In the embodiment, the format of the second color signal is the same as the first color signal. The FIG. 6A-FIG.

6C are also schematic diagrams of the second color signal. The first bit and the second bit of the second color signal are 10. For example, if the second color signal is 10000001, which represents the color of the electronic pencil 1 has been changed to red, then the drawing board 2 displays a red mark when the user draws on the drawing board 2 using the electronic pencil 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic pencil, comprising:
    a wireless unit;
    a color unit;
    a storage unit;
    at least one processor;
    one or more programs that are stored in the storage unit and are executed by the at least one processor, the one or more programs comprising:
    a reading module that reads color information from a first color signal wirelessly sent from a drawing board and received by the wireless unit, wherein the first color signal comprises control bits and color bits;
    a control module that controls the color unit to indicate a corresponding color according to the read color information; and
    a feedback module that transmits a second color signal as a reply to the first color signal to the drawing board.

2. The electronic pencil as claimed in claim 1, wherein the control bits represent a type of the first color signal, and the color bits represent a desired color of the electronic pencil.

3. The electronic pencil as claimed in claim 1, wherein the wireless unit is a near field communication (NFC) device, a WIFI device, or a wireless infrared communication device.

4. The electronic pencil as claimed in claim 1, wherein the color unit comprises a group of color light emitting diode (LED) lights and control circuits to control the LED lights.

5. The electronic pencil as claimed in claim 4, wherein each of the LED lights is switched to connect to a control switch to indicate the corresponding color.

6. The electronic pencil as claimed in claim 1, wherein the control bits of the first color signal represent a request for changing the color of the electronic pencil.

7. The electronic pencil as claimed in claim 1, wherein the second color signal comprises control bits and color bits, the control bits of the second color signal representing a feedback of a request for changing a color of the electronic pencil represented by the color bit of the second color signal.

8. A method for indicating a color of an electronic pencil being executed by a processor of the electronic pencil, the method comprising:
    (a) reading color information from a first color signal wirelessly sent from a drawing board and received by a wireless unit in the electronic pencil, wherein the first color signal comprises control bits and color bits;
    (b) controlling a color unit in the electronic pencil to indicate a corresponding color according to the read color information; and
    (c) transmitting a second color signal as a reply to the first color signal to the drawing board.

9. The method as claimed in claim 8, wherein the control bits represent a type of the first color signal, and the color bits represent a desired color of the electronic pencil.

10. The method as claimed in claim 8, wherein the wireless unit is a near field communication (NFC) device, a WIFI device, or a wireless infrared communication device.

11. The method as claimed in claim 8, wherein the color unit comprises a group of color light emitting diode (LED) lights and control circuits to control the LED lights.

12. The method as claimed in claim 8, wherein the control bits of the first color signal represent a request for changing the color of the electronic pencil.

13. The method as claimed in claim 8, wherein the second color signal comprises control bits and color bits, the control bits of the second color signal representing a feedback of a request for changing a color of the electronic pencil represented by the color bit of the second color signal.

14. A non-transitory storage medium storing a set of instructions, the set of instructions capable of being executed by a processor of an electronic pencil to perform a method for indicating a color of the electronic pencil, the method comprising:
    (a) reading color information from a first color signal wirelessly sent from a drawing board and received by a wireless unit in the electronic pencil, wherein the first color signal comprises control bits and color bits;
    (b) controlling a color unit in the electronic pencil to indicate a corresponding color according to the read color information; and
    (c) transmitting a second color signal as a reply to the first color signal to the drawing board.

15. The non-transitory storage medium as claimed in claim 14, wherein the control bits represent a type of the first color signal, and the color bits represent a desired color of the electronic pencil.

16. The non-transitory storage medium as claimed in claim 14, wherein the wireless unit is a near field communication (NFC) device, a WIFI device, or a wireless infrared communication device.

17. The non-transitory storage medium as claimed in claim 14, wherein the color unit comprises a group of color light emitting diode (LED) lights and control circuits to control the LED lights.

* * * * *